United States Patent
Wenger et al.

(10) Patent No.: US 11,795,958 B2
(45) Date of Patent: Oct. 24, 2023

(54) METHOD FOR DETERMINING OPERATING STATES OF A FAN

(71) Applicant: ZIEHL-ABEGG SE, Künzelsau (DE)

(72) Inventors: Bjoern Wenger, Schrozberg (DE); Matthias Kammerer, Kupferzell (DE); Xenia Gaida, Niedernhall (DE); Joachim Knorr, Niederstetten (DE); Raphael Obst, Öhringen (DE); Michael Peters, Zweiflingen (DE); Dominik Schuebel, Künzelsau (DE); David Kappel, Künzelsau (DE)

(73) Assignee: ZIEHL-ABEGG SE, Kunzelsau (DE)

( * ) Notice: Subject to any disclaimer, the term of this patent is extended or adjusted under 35 U.S.C. 154(b) by 726 days.

(21) Appl. No.: 16/967,675

(22) PCT Filed: Feb. 4, 2019

(86) PCT No.: PCT/DE2019/200007
§ 371 (c)(1),
(2) Date: Aug. 5, 2020

(87) PCT Pub. No.: WO2019/149324
PCT Pub. Date: Aug. 8, 2019

(65) Prior Publication Data
US 2021/0156388 A1    May 27, 2021

(30) Foreign Application Priority Data
Feb. 5, 2018   (DE) .......................... 102018201707.7

(51) Int. Cl.
*F04D 27/00* (2006.01)
(52) U.S. Cl.
CPC .......... *F04D 27/001* (2013.01); *F04D 27/008* (2013.01); *F05D 2260/81* (2013.01)

(58) Field of Classification Search
CPC ... F04D 27/004; F04D 27/008; F05D 2260/81
See application file for complete search history.

(56) References Cited

U.S. PATENT DOCUMENTS

| 5,210,704 A | 5/1993 | Husseiny |
| 9,551,504 B2 * | 1/2017 | Arensmeier ........ F24D 19/1087 |

(Continued)

FOREIGN PATENT DOCUMENTS

| AT | 514683 A4 | 3/2015 |
| CN | 105359045 A | 2/2016 |

(Continued)

OTHER PUBLICATIONS

Tao Fei et al., "Digital twin and its potential application exploration", Computer Integrated Manufacturing Systems, vol. 24, No. 1, Jan. 2018, 18 pages.

*Primary Examiner* — Long T Tran
(74) *Attorney, Agent, or Firm* — FisherBroyles, LLP; Jason P. Mueller

(57) ABSTRACT

A disclosed method of determining operating states of a fan uses a digital image of the fan and at least one operating parameter-specific algorithm. In a first stage, the method includes generating the digital image of the fan as a representation of the fan's properties, the representation based on one or more mathematical calculation models and optionally known data. The method further includes generating the at least one operating parameter-specific algorithm based on at least one of known relationships and characteristic curves, and calculating component states of the fan via the digital image, wherein the calculation of component states is based on virtual sensors. The method further includes generating a system behavior algorithm that calculates operating parameters of the fan based on the component states and optionally generates predictions relating to the operation of the fan.

11 Claims, 8 Drawing Sheets

(56) References Cited

U.S. PATENT DOCUMENTS

Figure 1:

| | | | | |
|---|---|---|---|---|
| 9,918,410 | B2* | 3/2018 | Humphrey | F04D 27/0269 |
| 2008/0028778 | A1* | 2/2008 | Millet | G06F 1/206 |
| | | | | 700/300 |
| 2015/0361864 | A1* | 12/2015 | Wagner | F01P 7/08 |
| | | | | 165/300 |
| 2016/0132050 | A1 | 5/2016 | Heller et al. | |
| 2017/0286572 | A1* | 10/2017 | Hershey | B64F 5/60 |
| 2020/0326672 | A1* | 10/2020 | Ma | F02C 9/00 |
| 2021/0091636 | A1* | 3/2021 | Kowalski | H02K 9/06 |

FOREIGN PATENT DOCUMENTS

| | | |
|---|---|---|
| DE | 10257793 A1 | 7/2004 |
| DE | 102005032720 A1 | 1/2007 |
| DE | 102008005690 A1 | 1/2009 |
| DE | 102010002294 A1 | 8/2011 |
| EP | 1510805 A1 | 3/2005 |
| JP | 2004003891 A | 1/2004 |
| JP | 2006142994 A | 6/2006 |
| RU | 2113699 C1 | 6/1998 |
| RU | 2554544 C2 | 6/2015 |
| RU | 2622493 C1 | 6/2017 |

* cited by examiner

Parameters for the design of bearing grease service life
- Continuous operation,
- Bearing type: 608-2Z
- Viscosity: 70
- Speed: 1290 rpm
- Grease temperature: 110°C
- Operating time/service life: 40,000 h Calculation example

| Time of day | Temperature | Factor | Consumed service life |
|---|---|---|---|
| 0:00 - 0:01 | 110°C | 1 | 1 min |
| 0:01 - 0:02 | 120°C | 2 | 2 min |
| 0:02 - 0:03 | 130°C | 4 | 4 min |
| 0:03 - 0:04 | 140°C | 8 | 8 min |

Result
- Operating hours: 4 min
- Consumed service life: 15 min

METHOD FOR DETERMINING OPERATING STATES OF A FAN

This disclosure relates to a method for determining operating states of a fan, wherein the term "fan" is to be understood in the broadest meaning. In addition, the teaching of the disclosure can also be applied to the arrangement of multiple fans, fan groups, or fan systems. In the case of the arrangement of multiple fans, it relates to the interaction of the fans, including a coordination between the fans. At this point it should be noted that the term "determination" is to be understood in the broadest meaning. This includes, among other things, the calculation of the operating states, if this is possible.

This disclosure is based on the concept of ensuring the best possible efficiency and the best possible running performance at every operating point of the fan. This is difficult due to opposing operating parameters.

It is known from practical experience of a fan that the ball bearing and the ball bearing grease are important parameters for the service life of the fan. The service life of the ball bearing and the ball bearing grease largely depends on the operating temperature in or on the motor and the mechanical forces acting on the ball bearing. Since neither temperature sensors nor force sensors are positionable in the immediate vicinity of the bearing, neither the bearing temperature nor the bearing forces acting on the bearing may be measured. It is therefore necessary to either measure these parameters indirectly or to determine them arithmetically.

A system and a method for determining the state of the bearing of an electric machine are known from DE 10 2010 002 294 A1. Real sensor devices determine a measured value that is transmitted to a simulation device. A result value is determined by the simulation device, which is either a bearing current value or a value dependent on the bearing current. The result value is transmitted to another device for further calculation. The known system/method is complex due to the required sensors and is difficult to use in fans due to the lack of sufficient installation space.

This disclosure is based on the object of ensuring the best possible efficiency and the best possible running performance at every operating point of the fan using disclosed methods. In addition, a service life assessment is to be possible to be able to implement new services such as predictive maintenance, etc. It is to be considered that it is difficult to attach the required sensors at suitable positions.

According to the disclosure, the above object is achieved by a method having the features of claim 1, which is specifically a method for determining operating states of a fan using a digital image (digital twin) of the fan, in which at least one operating parameter-specific algorithm is involved.

More precisely, a digital image of the real fan is created by depicting its properties by mathematical calculation models and possibly involving known data, possibly real measurement data. The real measurement data can be current measurement data from the ongoing operation of each individual motor (and possibly its history). Furthermore, at least one operating parameter-specific algorithm is created in consideration of known relationships, characteristic curves, etc. and used for the further calculation.

Component states of the fan are determined or calculated via the digital image using virtual sensors. These component states are fed to the operating-specific or operating parameter-specific or product-specific algorithm, which determines or calculates specific operating parameters of the fan from the component states and possibly, derived therefrom, supplies predictions relating to the operation of the fan, for example, predictions of the service life of the fan. It is advantageous that the combined use of determined component states and real measurement data is possible. According to the disclosure, two different software components are used, namely a first software component relating to the digital twin and a second software component relating to the operating parameter-specific algorithm, which can be referred to as an "intelligent" algorithm.

The digital twin is a digital image of a real, individual object, in the case of the teaching according to the disclosure of a fan or a fan system. The digital twin depicts the properties of the fan by a calculation model and possibly using known data of the fan. The task of the digital twin can be considered that of calculating component states of the components of the fan as a function of the respective operating state using virtual sensors. The component states determined on the basis of such a calculation are transmitted to the operating parameter-specific algorithm, which determines/calculates operating parameters or operating states of the fan from the operating data of the digital twin, for example, the bearing service life and/or the bearing grease service life. Based on the result, a situation-suitable control adjustment is possible Operating parameters and operating states are equally relevant insofar as they are calculable variables.

The above-explained combination of digital twin and operating parameter-specific algorithm may be implemented in terms of a digital twin algorithm on a microprocessor associated with the motor of the fan and may thus be associated with the fan as a fixed component.

The teaching according to the disclosure, which can be summarized under the term "digital twin algorithm", is the combination of a digital twin describing the fan with a type of intelligent algorithm that is configured to be specific to the operating parameters.

With a suitably configured fan, predictive maintenance can be carried out with the goal of avoiding a fan failure, for example due to a damaged bearing or bearing grease. An effort is made for a situation-suitable adjustment of the system parameters to be able to achieve nearly the maximum possible service life of the fan.

Using a digital image of the fan and operating parameter-specific algorithms, the goal of predictive maintenance is to exhaust the service life of the fan components as completely as possible and at the same time to avoid any failure of the fan. The service life of the fan is calculated on the basis of calculated component states and operating parameters resulting therefrom.

The digital twin uses physical and/or mathematical and/or statistical and/or empirical and/or combined models to calculate thermal and mechanical component states. In any case, both mathematical and also physical and non-physical models are included. The operating parameter-specific algorithm (intelligent algorithm) requires the component states determined by the digital twin in order to determine any operating parameters, for example also to predict the fan failure. Since the service life of a fan primarily depends on the ball bearings and the ball bearing grease, the operating parameter calculation focused on the ball bearing grease and the ball bearing plays a very special role.

It is known from practice that the service life of bearing grease largely depends on the operating temperature. The higher the operating temperature over the entire service life, the faster the bearing grease will be consumed. It is therefore important to determine the bearing temperature in order to determine the bearing grease service life.

To determine the bearing temperature, a temperature sensor would have to be positioned in the immediate vicinity of the bearing. This is not possible due to the geometrical and functional conditions of the fan/motor. Accordingly, in the manner according to the disclosure, component states such as the bearing temperature are calculated via the digital twin together with an operating parameter-specific algorithm.

The calculation is based on a mathematical model, which in turn is based on a reduced coupled thermomagnetic calculation model. The combination of a digital twin together with an operating parameter-specific algorithm calculates heat sources, heat sinks, and the thermal state of the overall system relating to the motor of the fan. The bearing grease temperature may thus be determined via the virtual sensors of the digital twin as a function of the operating state of the fan/motor and fed into the operating parameter-specific algorithm as the operating state.

Both the digital twin, including its virtual sensors, and the operating-parameter-specific algorithm may be implemented in the machine code (C code) on the existing microprocessor, which means that a certain machine intelligence is incorporated into the fan.

Although the development method and the function of the method according to the disclosure will now be discussed using the example of the bearing and bearing grease service life, the method can relate to all conceivable operating parameters of the fan. The use of the method according to the disclosure always makes sense if the respective parameters are not directly measurable, but knowing them can be used to optimize the operation of the fan.

There are various options for advantageously implementing and refining the teaching of the present disclosure. For this purpose, reference is made on the one hand to the claims subordinate to claim 1 and on the other hand to the following explanation of exemplary embodiments of the disclosure with reference to the drawing. In connection with the explanation of the exemplary embodiments of the disclosure with reference to the drawings, designs and refinements of the teaching are also explained. In the figures FIGS. 1 to 8 show method stages for implementing the teaching according to the disclosure with special characteristics.

FIG. 1 shows the principle of the method according to the disclosure, wherein the combination of the digital twin with at least one operating parameter-specific algorithm (intelligent algorithm) is referred to as a digital twin algorithm, in the following example for the service life of the bearing grease and/or the bearing.

As already noted, the service life of bearing grease and bearing is dependent on the operating temperature and the speed of the motor. Since no temperature sensor is positionable in the immediate vicinity of the bearing, the bearing temperature has to be calculated by a model, according to the disclosure using the digital twin algorithm, which results from a combination of a digital twin and an operating parameter-specific algorithm (intelligent algorithm).

The digital twin is nothing more than a mathematical model, which is based on a reduced coupled thermomagnetic and mechanical calculation model. The digital twin calculates the thermal and mechanical condition of the overall system affecting the motor. The digital twin can determine the bearing grease temperature depending on the operating state of the motor by way of the virtual sensors associated with the digital twin.

The intelligent algorithm requires the component states for further processing of the data, for example to predict the fan failure. The failure of the motor can be calculated or at least estimated on the basis of failure characteristic curves. All of the software relating to the digital twin algorithm is implemented in the machine code (C code) on the motor microprocessor, so that no further electronics are required.

Figure 2:
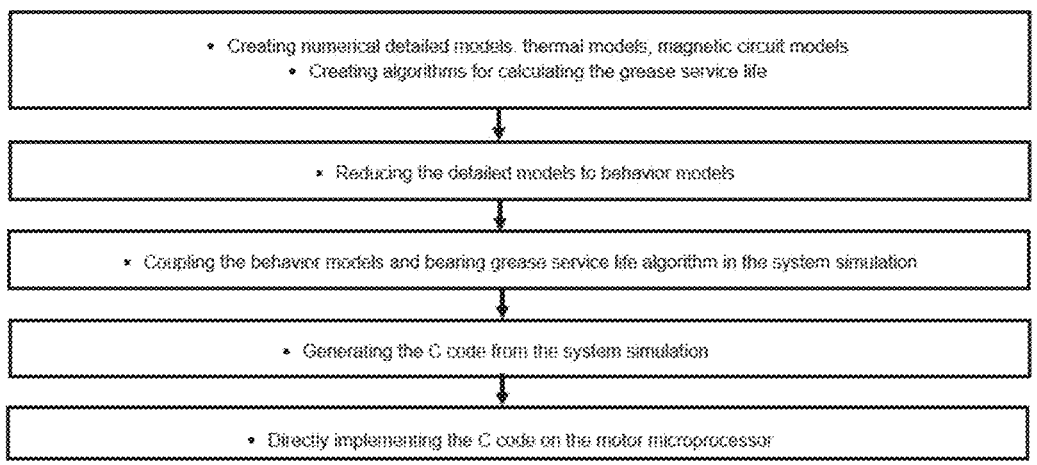

FIG. 2 shows the sequence of the bearing grease service life calculation of the bearing grease in the bearing of a fan motor. Numerical detailed models, specifically thermal models, magnetic circuit models, etc. are required in the scope of creating the digital image of the real fan. In addition, algorithms for calculating the grease service life are created.

The detailed models are then reduced to behavior models so that the data volume is manageable.

The behavior models and the algorithm that calculates the bearing grease service life are then coupled in a system simulation, namely as in the scope of a combination of the digital twin with the operating parameter-specific algorithm, which in the present case calculates the bearing grease service life. The C code is generated from the system simulation and the C code is directly implemented on the motor microprocessor.

As previously stated, the model reduction of the detailed model to a behavior model is required to reduce the computing time. As a result of this measure, the digital twin algorithm can be implemented on the microprocessor of the motor. Various methods can be used for thermal model reduction, for example the Krylov method. The data of the detailed model are reduced by reducing the model order.

The magnetic detailed model can be reduced by an algorithm or by a table. Pre-calculated results are defined in the table for certain constellations, so that complex calculations may be replaced by a quick value search. With the correspondingly reduced models, the bearing grease temperature and the bearing temperature can be calculated. The calculated values use the operating parameter-specific algorithm, here the algorithm that calculates the bearing grease service life, in order to calculate the service life of the bearing grease, on the one hand, and the bearing, on the other hand.

It is also possible to weight, (e.g. exponentially), the consumed service life of the bearing/the bearing grease depending on the operating temperature.

Figure 3:
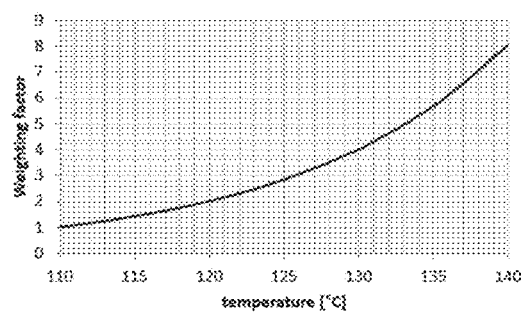

FIG. 3 shows the curve of such a weighting factor over the temperature curve, wherein the bearing grease service life calculation is based on exemplary parameters such as continuous operation, type of bearing, viscosity, speed, grease temperature, and operating time/service life. With an operating time of four minutes, the calculation example gives a consumed lifetime of 15 minutes.

In the manner according to the disclosure, the reduced models according to the digital twin and the operating parameter-specific algorithm relating to the bearing grease service life are integrated into a system simulation and linked together. The system simulation can be created, for example, in the MATLAB program. Using the MATLAB code generator, it is possible to translate the system simulation into the C code and implement it on the motor microprocessor.

Figure 4:
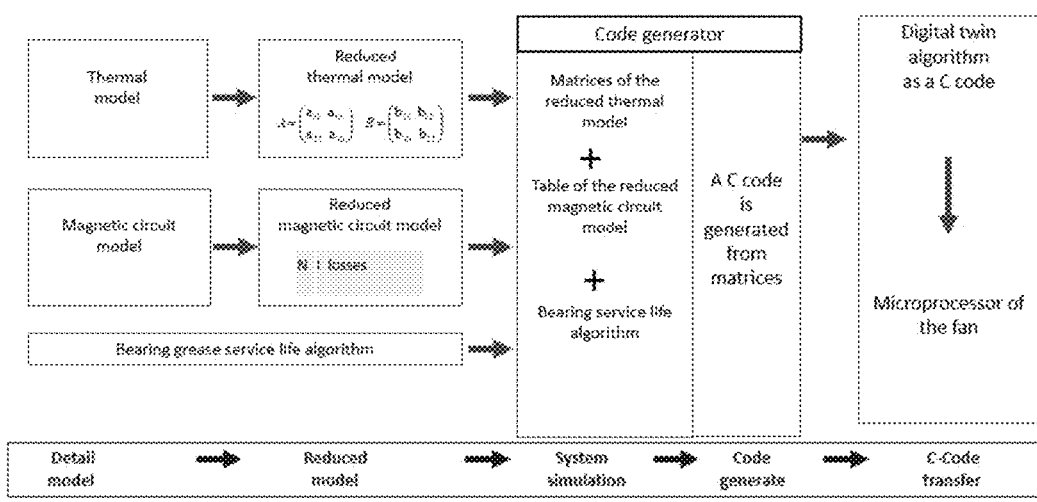

FIG. 4 shows the application of the method according to the disclosure using the bearing grease service life calculation as an example, wherein the model consideration of the digital twin is based on a thermal model and a magnetic circuit model. Both models are converted into a reduced thermal model and a reduced magnetic circuit model.

The digital twin is combined with an operating parameter-specific algorithm, namely an algorithm that determines the bearing grease service life.

Starting from a detailed model, this is reduced, namely a reduced model is derived. This reduced model can be in the form of a matrix, wherein the matrix is translated in a system simulation into a C code, namely using a C code generator. The reduction of the detailed model can also be done in another way.

The detailed model thus results in a reduced model. In consideration of the algorithm calculating the bearing grease service life, a system simulation takes place, from which a code is generated. This code is transmitted to the motor microprocessor, for example, with a calculation in real time, in contrast to a time-shifted processing in the cloud.

Figure 5:
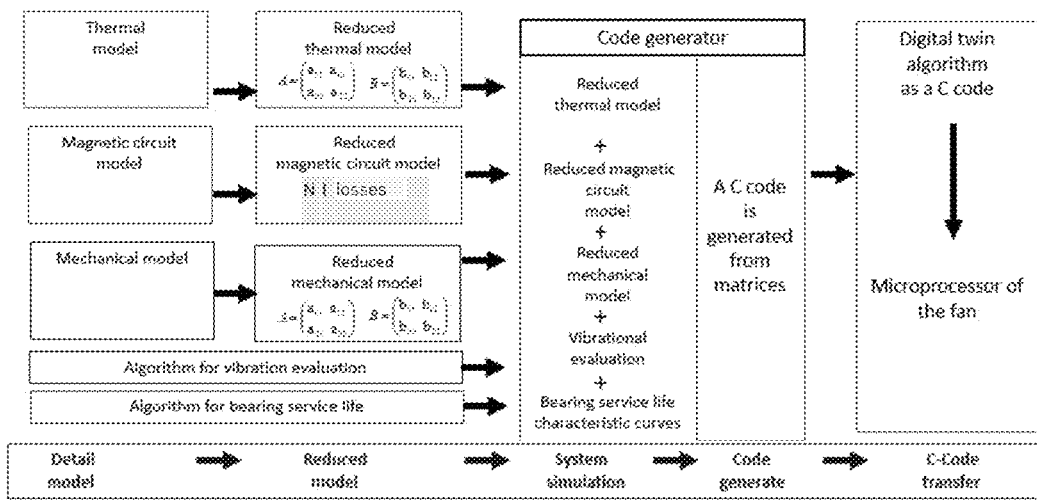

FIG. 5 shows the calculation of the bearing service life, wherein in addition to the calculation of the bearing grease service life shown in FIG. 4, a mechanical model is added, which is converted into a reduced mechanical model.

Two further operating parameter-specific algorithms are used for the further calculation, namely for vibration evaluation, on the one hand, and for calculating the bearing service life, on the other hand.

As with the calculation of the bearing grease service life, the data are linked via system simulation, wherein a C code is generated from matrices thus obtained. This is transferred to the motor microprocessor.

The above explanations regarding the calculation of the bearing grease service life and bearing service life make it clear that the method according to the disclosure and the digital twin algorithm resulting therefrom are a key function for the "digitization" of the fan, since crucial items of information are calculated and analyzed, while reducing the total resulting data.

The important items of information are ultimately operating states, which are determined in the context of the digital twin using virtual sensors to thus be able to calculate the bearing grease service life and the bearing service life in the fan.

At this point it should be noted that any conceivable operating state can be calculated using the method according to the disclosure, i.e., by a digital twin algorithm, on the basis of the virtual sensors, which is impossible using real sensors due to design limits and the costs linked to such sensors.

On the basis of the data reduction discussed above, the method according to the disclosure allows a compact C code to be created which can be operated on standard microprocessors. A kind of data refinement (Big Data→Smart Data) takes place on the microprocessor, wherein this is the calculation result. Only the compressed, refined data are further processed or, for example, sent to a cloud. It goes without saying that this significantly reduces the streaming volume of the connection to the cloud.

In addition, it is only necessary to query the remaining service life of the fan or motor at arbitrary or defined time intervals, as a result of which a linear behavior or a drift can be recognized. As previously stated, real sensors can be saved in favor of the installation space and to reduce costs.

Furthermore, the operating parameters determined on the basis of the digital twin and operating parameter-specific algorithm may be used for the predictive maintenance and for the maintenance of a fan, on the one hand, and for the optimization of the configuration and the operation of a fan, on the other hand.

Figure 6:
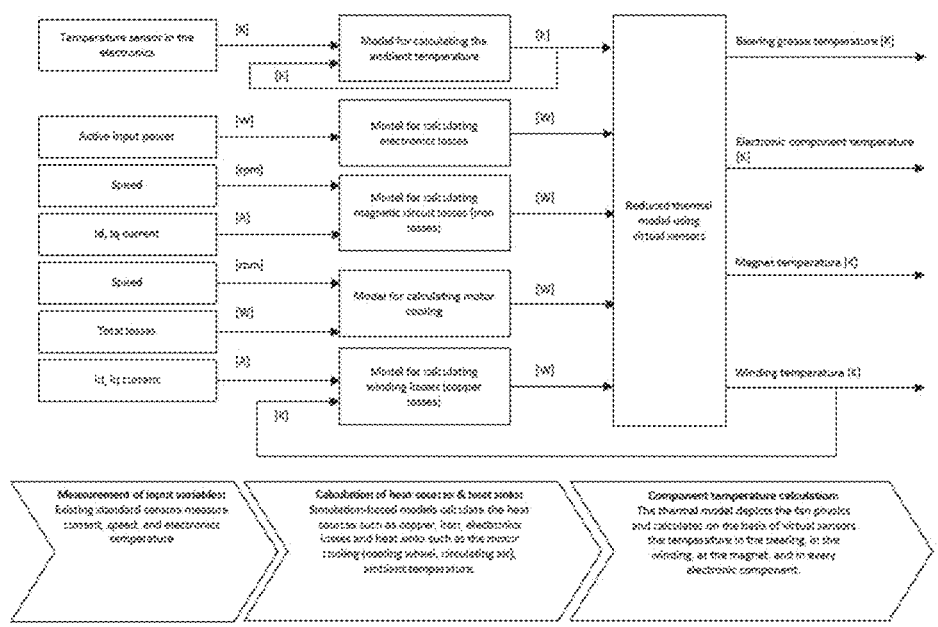
Figure 7:
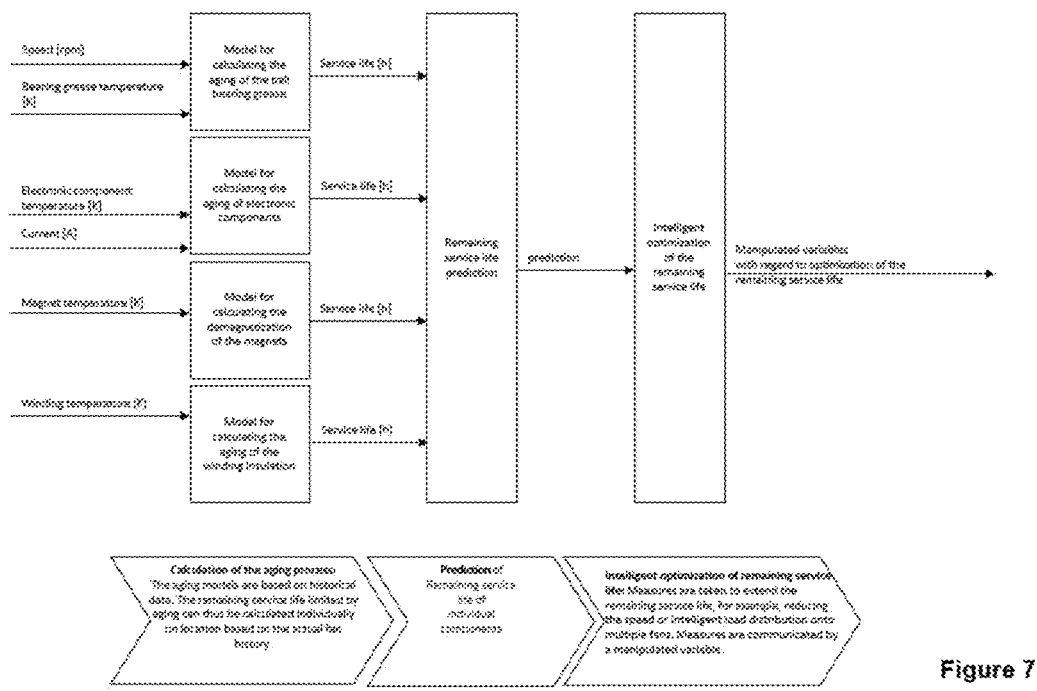
Figure 8:
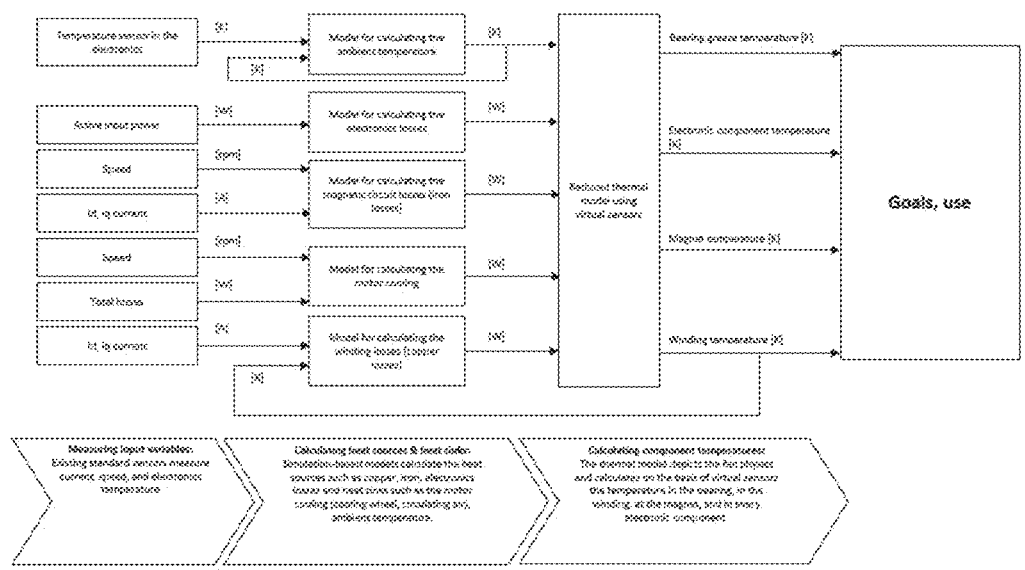

The illustration in FIGS. 6 and 7 is used to further explain the claimed teaching as has already been discussed by way of example with reference to FIGS. 4 and 5.

The use of a digital image, namely a digital twin of the fan, is advantageous. The digital twin results from data processing. Specifically, it results from a combination of known input variables or sensor measured values with calculated values and calculations/models. The determination of component temperatures, flows, losses, etc. at specific predetermined points of the fan is carried out on the basis of the digital twin. Real values, for example, specific component temperatures, are virtually determined on the basis of the digital twin, namely if an economically/structurally reasonable option for measurement by sensors does not exist on the respective specific point of the fan.

The operating parameter-specific algorithm is of further importance for the claimed teaching. On the basis of the results or data supplied by the digital twin, for example the bearing temperature, parameters, for example, a probability of failure or consumed service life of the fan or the bearing of the fan are determined. These parameters are dependent on the current operating parameters of the fan and its history, i.e., at which operating points and environments the fan is/was operated.

FIGS. 6 and 7 illustrate, on the basis of a specific example, the method according to the disclosure for determining operating states of a fan using a digital image of the fan in consideration of the above statements.

In the left column of FIG. 6 there are measured or calculated input variables including the units assigned to the arrows. These input variables are measured via existing standard sensors or are known.

Heat sources and heat sinks are calculated from these input variables. It is based on simulation-based models that take into consideration heat sources, for example, copper, iron, and electronics losses and heat sinks such as the motor cooling (cooling wheel, air flow, and ambient temperature). This results in input variables for a reduced thermal model using virtual sensors. All this corresponds to the digital twin in the sense of a thermal model.

Component temperatures are calculated from the reduced thermal model using virtual sensors. The thermal model images the fan physics and calculates on the basis of virtual sensors the temperature in the bearing, in the winding, on the magnets, and in the various electronic components, as needed.

As a continuation of FIG. 6, FIG. 7 clearly shows that output variables from the reduced thermal model, possibly with further parameters, are used as input variables for calculating the aging process. Underlying aging models are based on historical data and can be stored as characteristic curves. The remaining service life limited by aging can thus be calculated or corrected individually on location based on the actual fan history and the current operating status.

The respective models for calculating the aging result in a calculated service life in days or hours, which in itself can be used solely as information. The relevant items of information can then be used for the further prediction, namely the prediction of the remaining service life of the individual components or of the entire fan. This prediction can then be used for the intelligent remaining service life optimization. Measures can be taken to extend the remaining service life, for example, a reduction of the speed or an intelligent load distribution onto multiple fans. These measures can be communicated by a manipulated variable.

FIG. 8 shows once again the digital twin up to the reduced thermal model using virtual sensors, wherein the fan including the motor is thus depicted. As previously stated, the thermal model depicts the fan physics and calculates various temperatures on the basis of virtual sensors, which are used for different purposes/goals/uses, in keywords, for example:

for monitoring: determining operating parameters with the aid of virtual sensors and using them for monitoring. These can be: warning messages, status LEDs, comments in a readable error code, images in the cloud or app application, display in user interfaces.

for predictive maintenance: method for determining the aging of a fan, consisting of numerous subsystems such as ball bearings, windings, electronic components, magnets, and predicting the remaining service life. Use, for example, to plan maintenance intervals, to achieve the longest possible service life before the maintenance interval (i.e., no maintenance too early), automatic scheduling of maintenance appointments, notification of need for maintenance, automatic ordering of replacement parts.

for optimization: method for determining operating states relating to the product performance, i.e., efficiency, component temperatures, speed, output power, volume flow, volume, vibrations, etc.

for creating an intelligent fan: response to specific operating states to improve the behavior or to achieve specific goals.

Changing the operating point/changing the control parameters for optimum efficiency.

Changing the operating point to achieve the longest possible service life.

Reducing the speed if the probability of failure is very high:

Changing the operating point with a day-night rhythm for the quietest possible night use.

Outputting a manipulated variable for additional devices or customer devices, for example, temperature output for use in control of a heat pump, or for additional cooling.

Intentionally avoiding critical system states (e.g., resonance, excess temperatures, etc.).

The following is relevant for creating detailed models:

A model is an image or an approximation of reality, which by definition means an approximation. A model is always limited to a section that is of interest for the intended image. In addition, a model is fundamentally not complete, since it is either reduced for easier use in terms of its necessary input variables, or individual physical behavior elements are not known when the model is created. Depending on the later use and objectives, a different type of modeling is necessary, for example a different region under consideration, a different accuracy required in the results, or the speed of the calculation. There are very many types of models, wherein in the technical field a model is usually linked to a mathematical representation, for example, to algebraic equations or inequalities, systems of ordinary or partial differential equations, state space representations, tables, graphs.

Virtual product development using FE simulation (Finite Element Simulation) is an integral part of current product development. Classically, a physical domain (e.g., strength or thermal or magnetic circuit) is imaged in a very large (order of magnitude 100 gigabytes) and computation-intensive model and the results are determined at millions of points (nodes) in the model. This is a variant of detailed models. The rough sequence in the creation of these detailed models can be outlined as follows:

1. Importing a 3D geometry, for example from the field of CAD,
2. Assigning boundary conditions, i.e., fixed clamps, material definitions, contact conditions (adhesive points, sliding connections, thermal insulation),
3. Networking (splitting the geometry into millions of small elements that are linked),
4. Applying the load, i.e., forces, heat sources/heat sinks, magnetic fields,
5. Automatically solving the resulting differential equations for each individual element and merging them to form one large result for the overall model,
6. Evaluating the results.

The generation of reduced models can be carried out as follows:

A model reduction very generally describes an existing model in order to reduce further information, for example to optimize it for memory requirement or computing speed. There are many variants depending on the specific application here, such as:

Approximating simple mathematical functions, such as polynomial functions, and only storing the coefficients.

Storing tables for various input variables and subsequently either using these discrete values or interpolating between the values.

Approximating statistical models that supply predictions from previous values.

Graphs/logical gates, example: if T>200° C., then fan is defective.

Generation of the Reduced Models—Example a)

The starting point for the reduced model is an FE model of thermals, which depicts the temperatures in every point of the model depending on the heat input and heat output. In the following example, the model reduction is simplified to only one heat input and one heat output, only one temperature to be determined at point A, and only the values "high" and "low" in each case. For this purpose, a parameter study is carried out, whereby this so-called "look-up table" is determined.

| Temperature at the point A | Heat input = low = 1 W | Heat input = high = 11 W |
|---|---|---|
| Heat output = low = 1 W | 40° C. | 80° C. |
| Heat output = high = 5 W | 20° C. | 60° C. |

There are subsequently several options for using the results.

Using the table directly and discretely. Example: If a temperature at point A is to be predicted for a heat input of 4 W and heat output of 1 W, the value of 40° C. is adopted directly.

Using the table and linearly interpolating between the values. Example: If a temperature at point A is to be predicted for a heat input of 5 W and heat output of 1 W, the value of 60° C. is determined via linear interpolation.

Using the table to determine a temperature prediction function by regression. Examples of target functions are polynomial functions, linear functions, exponential functions, statistical functions, differential equations, etc. Subsequently determining the temperature with the aid of this function.

Generating the Reduced Models—Example b)

The starting point for the reduced model is an FE model of thermals, which depicts the temperatures in every point of the model depending on the heat input and heat output. Subsequently, compact state space models can be approximated using mathematical assumptions, calculations, and transformations (for example, LTI system or Krylov subspace method). These consist of two differential or integral equations and four matrices that describe the entire system (for example, 200×200 matrices filled using scalar numeric values). However, these no longer represent the temperature at millions of nodes, but only at a few selected points. In addition, the approximation leads to a deviation of the results depending on the size of the state space model. Basically, the larger the model and its matrices, the smaller the deviation.

State space models are available as procedures, modules, or objects in many computer algebra programs such as Matlab or in programming languages as standard features, which means that such models can be calculated by simply importing the matrices. Input variables are, for example, heat power that enters the system and heat sinks due to convection, output variables are, for example, specific component temperatures (for example, three different component temperatures).

Generating the Reduced Models—Example c)

In this example, the starting point for the model reduction are experimental results. Here, just like in example a), a table would be created from measurement results and the equivalent procedure would be used thereafter (discrete use, linear interpolation, or regression by mathematical functions).

A coupling of physical domains or various models can be of further importance.

Classically, domains are considered individually in virtual product development, since a joint consideration is very computing-intensive and memory-intensive and is hardly practical. The model reduction offers the possibility of coupling the models from various domains. For example, coupling a detailed magnetic circuit model, whose computing time on a high-performance computing cluster takes several days to weeks, with a thermal model is not advantageous. By reducing the detailed models, the required computing power and the memory requirement become lower, and the coupling of the models with regard to the economic aspect is made possible. In many cases, this is necessary to depict the real behavior as accurately as possible.

Coupling of Physical Domains or Various Models—Examples

The winding resistance is approximately linearly dependent on the temperature of the copper. Depending on the winding resistance, the power loss in the winding changes approximately linearly. Depending on the power loss, the thermal behavior changes, for example, the winding and bearing temperature is strongly nonlinear, which in turn affects the winding resistance. Depending on the requirements for the results of the model, a coupling is necessary here.

The required torque and the speed of a fan are strongly dependent on the facility resistance and, for example, the pressure difference and temperature of the conveyed medium. The behavior of the magnetic circuit, i.e., currents through the winding, magnetic field, speed, etc., changes depending on the load torque. Depending on this, power consumption, losses, and achievable speed also change. Here too, in the case of a customer application, it is conceivable to couple the fan behavior to the installation situation depending on the application.

Specification of a Technical Implementation—Example a)

Creating a thermal FE model of a fan→computing-intensive and memory-intensive FE model having 1,000,000 elements in addition to the polynomial function. Heat sources and heat sinks are depicted as polynomial functions as a function of the input current and speed.

Creating a reduced thermal model via statistical methods, which depicts the electronic component temperature as a function of input current and speed.→Polynomial function that describes the temperature as a function of input current and speed=virtual temperature sensor.

Characteristic curve from the data sheet on the service life of the electronic component depending on its temperature→Operating parameter-specific algorithm that calculates the probability of failure from a virtual temperature sensor.

Use for predictive maintenance, for monitoring, or for optimizing the operating point→Intelligent algorithm.

Specification of a Technical Implementation—Example b)

Detection of current pointer and motor speed by integrated electronics/control. The electromagnetic operating point is derived from this.

Based on this operating point, the losses of motor and power electronics result from look-up tables or polynomial functions.

A thermal model processes the loss values and determines the temperatures of important system components such as ball bearings or semiconductor components.

At the same time, component vibrations are recorded via a real sensor. The local vibrations are virtually projected onto the overall system by behavior models, whereby, for example, the bearing load due to vibrations is estimated.

With the aid of operating parameter-specific algorithms, determined temperatures and vibration values are converted into an estimation of the component and fan service life.

Further measures such as predictive maintenance can thus be made possible.

At the same time, with knowledge of the losses, the operating point and the system efficiency can be optimized by control engineering adjustments, such as the variation of the pilot control angle.

Finally, it is to be expressly noted that the above-described exemplary embodiments are used solely to explain the claimed teaching, but does not restrict it to the exemplary embodiments.

The invention claimed is:

1. A method of determining operating states of a fan using a digital image of the fan and at least one operating parameter-specific algorithm, the method comprising:
generating the digital image of the fan as a representation of the fan's properties, the representation based on one or more mathematical calculation models and optionally known data;
generating the at least one operating parameter-specific algorithm based on at least one of known relationships and characteristic curves;
calculating component states of the fan via the digital image, wherein the calculation of component states is based on virtual sensors;
generating a system behavior algorithm that calculates operating parameters of the fan based on the component states and optionally generates predictions relating to the operation of the fan.

2. The method of claim 1, wherein the digital image is based on one or more of a thermal model, a mechanical model, a magnetic circuit calculation model, a mathematical model, a physical model, an empirical model, a statistical model, and a combined model.

3. The method of claim 1, further comprising:
converting the one or more calculation models from a detailed model into a reduced model.

4. The method of claim 3, further comprising:
implementing the system behavior algorithm as computer program instructions configured to be executed by a processor-circuit,
wherein the system behavior algorithm is based on the digital image, optionally based on reduced models, and based on the at least one operating parameter-specific algorithm.

5. The method of claim 4, wherein computer program instructions representing the digital image and the at least one operating parameter-specific algorithm are implemented, optionally in the form of a simulation program, on a microprocessor,
wherein the computer program instructions are optionally implemented in machine code.

6. The method of claim 5, wherein the microprocessor is directly coupled to an electric motor of the fan.

7. The method of claim 1, further comprising:
calculating a thermal and/or mechanical state of the fan and optionally of a motor of the fan based on the digital image.

8. The method of claim 1, further comprising:
determining, by the virtual sensors of the digital image, component temperatures,
wherein the component temperatures are determined based on an operating state, using the one or more calculation models.

9. The method of claim 1, further comprising:
calculating, by the at least one operating parameter-specific algorithm, fan failure criteria or a prediction of fan failure to be expected,
wherein the calculation is based on the component states and is optionally based on failure criteria or a failure characteristic curve.

10. The method of claim 1, wherein the operating parameters characterize bearing service life and/or bearing grease service life.

11. The method of claim 1, further comprising using the determined operating parameters for predictive maintenance of the fan.

* * * * *